US012621558B2

(12) United States Patent
Tan

(10) Patent No.: US 12,621,558 B2
(45) Date of Patent: May 5, 2026

(54) PHOTOGRAPHING METHOD APPLIED TO A PHOTOGRAPHING APPARATUS HAVING A SCROLL SCREEN, ELECTRONIC DEVICE, AND NON-TRANSITORY READABLE STORAGE MEDIUM

(71) Applicant: VIVO MOBILE COMMUNICATION CO., LTD., Dongguan (CN)

(72) Inventor: Yajie Tan, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 59 days.

(21) Appl. No.: 18/650,799

(22) Filed: Apr. 30, 2024

(65) Prior Publication Data

US 2024/0284035 A1 Aug. 22, 2024

Related U.S. Application Data

(63) Continuation of application No. PCT/CN2022/127012, filed on Oct. 24, 2022.

(30) Foreign Application Priority Data

Nov. 1, 2021 (CN) .......................... 202111284986.6

(51) Int. Cl.
| | |
|---|---|
| *H04N 23/63* | (2023.01) |
| *H04N 23/53* | (2023.01) |
| *H04N 23/62* | (2023.01) |
| *H04N 23/69* | (2023.01) |

(52) U.S. Cl.
CPC .......... *H04N 23/632* (2023.01); *H04N 23/53* (2023.01); *H04N 23/62* (2023.01); *H04N 23/69* (2023.01)

(58) Field of Classification Search
None
See application file for complete search history.

(56) References Cited

U.S. PATENT DOCUMENTS

| | | | | |
|---|---|---|---|---|
| 2014/0101560 A1* | 4/2014 | Kwak | ................... | G06F 3/0488 |
| | | | | 715/788 |
| 2016/0057356 A1 | 2/2016 | Nagano et al. | | |
| 2017/0140504 A1* | 5/2017 | Jeong | ...................... | G06F 3/147 |

FOREIGN PATENT DOCUMENTS

| | | | | |
|---|---|---|---|---|
| CN | 107770442 A | * | 3/2018 | ............. H04N 23/64 |
| CN | 108228302 A | | 6/2018 | |
| CN | 108766235 A | | 11/2018 | |
| CN | 111757003 A | | 10/2020 | |

(Continued)

OTHER PUBLICATIONS

Wang, Lu; CN111988527A; Control Method, Device, Storage Medium and Electronic Device of Device; Nov. 24, 2020; English Translation; pp. 1-20 (Year: 2020).*

(Continued)

*Primary Examiner* — Cynthia Calderon

(74) *Attorney, Agent, or Firm* — The Webb Law Firm

(57) ABSTRACT

A photographing method includes receiving a first input performed by a user to the scroll screen; in response to the first input, obtaining a photographing parameter based on an unfolding parameter of the scroll screen, where the unfolding parameter is determined based on the first input; and performing photographing based on the photographing parameter, to obtain a target file, where the target file includes at least one of the following: an image or a video.

15 Claims, 7 Drawing Sheets

(56)           References Cited

FOREIGN PATENT DOCUMENTS

| | | | | | |
|---|---|---|---|---|---|
| CN | 111988527 | A | * | 11/2020 | ............ H04N 23/67 |
| CN | 112732151 | A | * | 4/2021 | ............ G06F 3/165 |
| CN | 112988010 | A | | 6/2021 | |
| CN | 113010063 | A | | 6/2021 | |
| CN | 114173029 | A | | 3/2022 | |

OTHER PUBLICATIONS

Shu, Mao-fei; CN107770442A; Method, Device and Terminal for Shooting The Image of; Mar. 6, 2018; English Translation; pp. 1-18 (Year: 2018).*

Deng, Shang-qing; CN112732151A; Adjusting Method of Control, Device, Terminal Device and Storage Medium; Apr. 30, 2021; English Translation; pp. 1-14 (Year: 2021).*

* cited by examiner

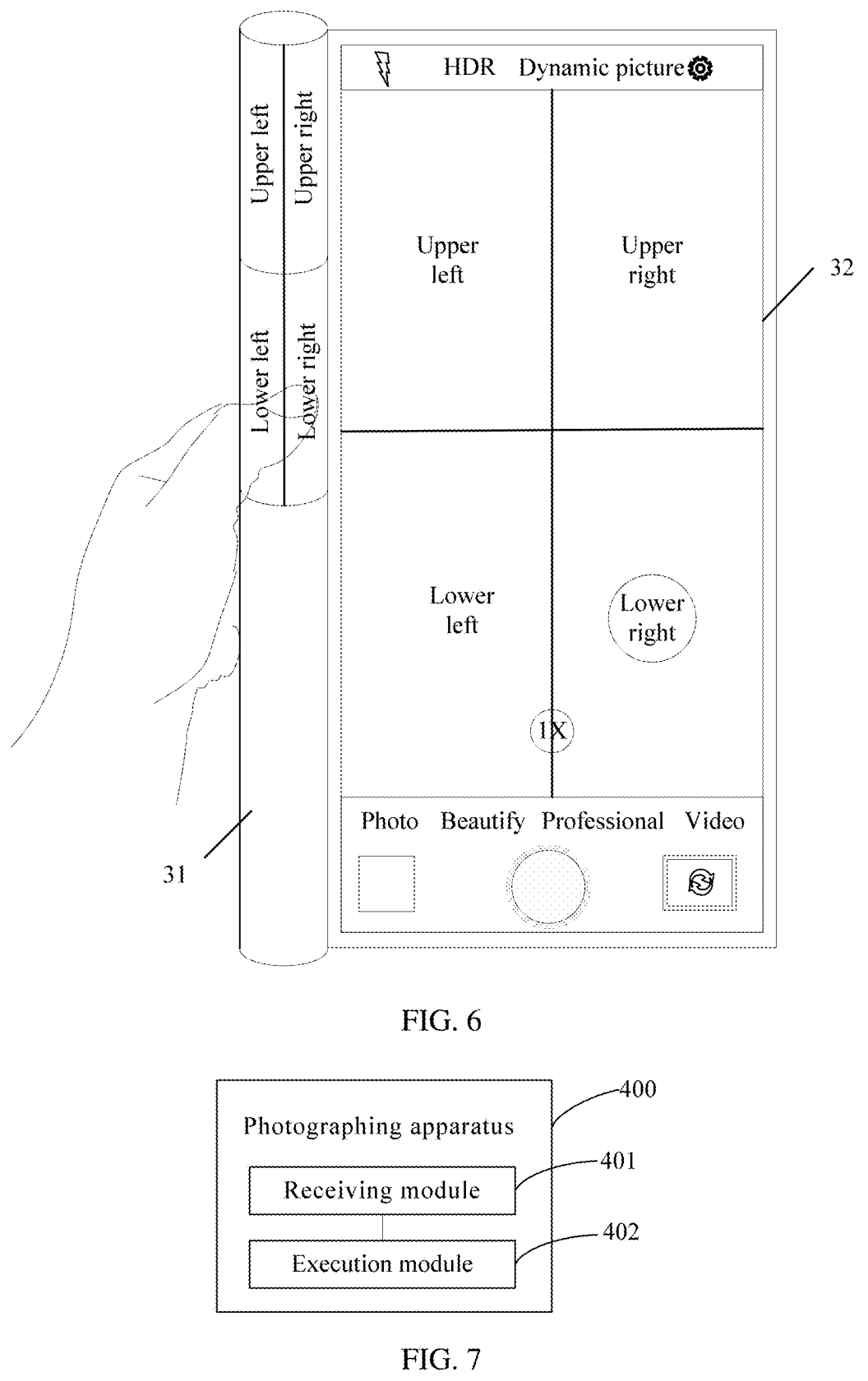

Upper left   Upper right

Lower left   Lower right

HDR   Dynamic picture ⚙

Upper
left

Upper
right

32

Lower
left

Lower
right

1X

Photo   Beautify   Professional   Video

Photographing apparatus                 400

Receiving module                         401

Execution module                         402

FIG. 7

PHOTOGRAPHING METHOD APPLIED TO A PHOTOGRAPHING APPARATUS HAVING A SCROLL SCREEN, ELECTRONIC DEVICE, AND NON-TRANSITORY READABLE STORAGE MEDIUM

CROSS-REFERENCE TO RELATED APPLICATIONS

This application is a Bypass Continuation application of International Patent Application No. PCT/CN2022/127012, filed Oct. 24, 2022, and claims priority to Chinese Patent Application No. 202111284986.6, filed Nov. 1, 2021, the disclosures of which are hereby incorporated by reference in their entireties.

BACKGROUND OF THE INVENTION

Field of the Invention

This application pertains to the field of photographing technologies, and in particular, to a photographing method, an electronic device, and a non-transitory readable storage medium.

Description of Related Art

With continuous development of electronic technologies, more applications are installed in a terminal device. However, a camera application in a terminal device has become one of essential applications in human life.

SUMMARY OF THE INVENTION

According to a first aspect, an embodiment of this application provides a photographing method, applied to a photographing apparatus having a scroll screen. The method includes: receiving a first input performed by a user to the scroll screen; in response to the first input, obtaining a photographing parameter based on an unfolding parameter of the scroll screen, where the unfolding parameter is determined based on the first input; and performing photographing based on the photographing parameter, to obtain a target file, where the target file includes at least one of the following: an image or a video.

According to second aspect, an embodiment of this application provides a photographing apparatus. The photographing apparatus includes a scroll screen, and the apparatus further includes: a receiving module, configured to receive a first input performed by a user to the scroll screen; and an execution module, configured to: in response to the first input received by the receiving module, obtain a photographing parameter based on an unfolding parameter of the scroll screen, where the unfolding parameter is determined based on the first input; and perform photographing based on the photographing parameter, to obtain a target file, where the target file includes at least one of the following: an image or a video.

According to a third aspect, an embodiment of this application provides an electronic device. The electronic device includes a processor, a memory, and a program or instructions stored in the memory and executable on the processor. When the program or the instructions are executed by the processor, steps of the method according to the first aspect are implemented.

According to a fourth aspect, an embodiment of this application provides a non-transitory readable storage medium. The non-transitory readable storage medium stores a program or instructions, and when the program or the instructions are executed by a processor, the steps of the method according to the first aspect are implemented.

According to a fifth aspect, an embodiment of this application provides a chip. The chip includes a processor and a communication interface, the communication interface is coupled to the processor, and the processor is configured to run a program or instructions to implement the method according to the first aspect.

BRIEF DESCRIPTION OF THE DRAWINGS

FIG. 6 is a fifth schematic diagram of an interface applied to a photographing method according to an embodiment of this application;

FIG. 7 is a schematic diagram of a structure of a photographing apparatus according to an embodiment of this application;

DESCRIPTION OF THE INVENTION

Figure 1:
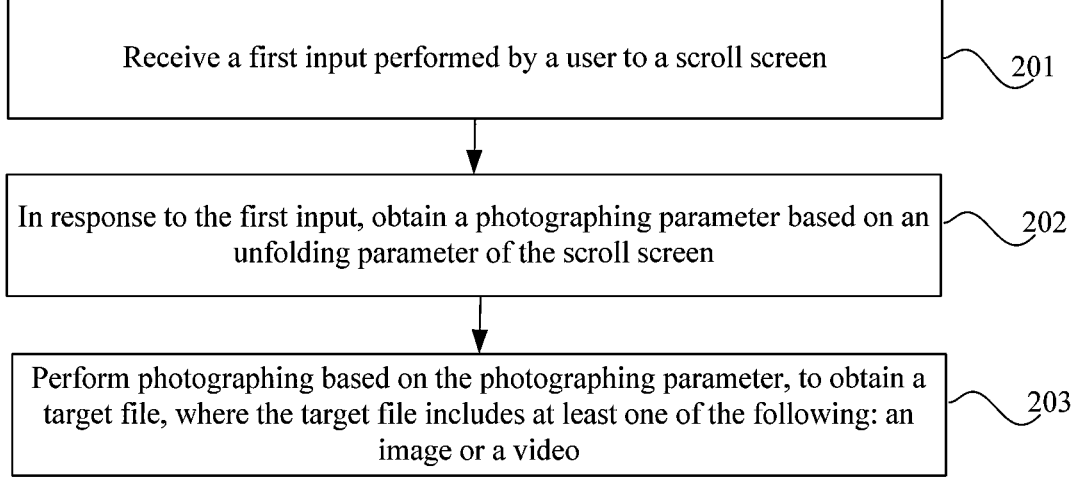
FIG. 1 is a schematic flowchart of a photographing method according to an embodiment of this application.

The following clearly describes technical solutions in embodiments of this application with reference to accompanying drawings in embodiments of this application. Apparently, the described embodiments are some but not all of the embodiments of this application. All other embodiments obtained by a person of ordinary skill in the art based on embodiments of this application shall fall within the protection scope of this application.

The terms "first", "second", and the like in this specification and claims of this application are used to distinguish between similar objects instead of describing an order or sequence. It should be understood that the term used in such a way is interchangeable in proper circumstances, so that embodiments of this application can be implemented in an order other than the order illustrated or described herein. Objects classified by "first", "second", and the like are usually of a same type, and the number of objects is not limited. For example, there may be one or more first objects. In addition, in this specification and the claims, "and/or" represents at least one of connected objects, and a character "/" generally represents an "or" relationship between associated objects.

Usually, to obtain a photo with a good display effect, before photographing, a user may adjust, by using a photographing parameter control, a display effect of a preview image displayed on a photographing preview interface of a screen. Photographing parameters generally include: brightness, contrast, saturation, a hue, a zoom ratio, or the like.

However, with continuous upgrade of screen hardware of an electronic device, a conventional photographing parameter adjustment manner is single and fixed, which cannot adapt to continuous changes of the screen hardware, and flexibility is not high.

A scenario in which the technical solutions provided in embodiments of this application is applied may be determined based on an actual use requirement. This is not limited in this application.

For example, the technical solutions provided in embodiments of this application may be applied to a photographing scenario.

It is assumed that a zoom ratio in a current photographing scenario is adjusted as an example. Usually, if a photographing preview interface is displayed, if a user wants to adjust a zoom ratio corresponding to the photographing preview interface, the user may tap or slide on a zoom ratio adjustment control on the photographing preview interface, to adjust a current zoom ratio to a target zoom ratio.

Embodiments of this application are applied to a photographing apparatus having a scroll screen. If the user wants to adjust the zoom ratio in the current photographing scenario, after a first input performed by the user to the scroll screen is received, an unfolding parameter of the scroll screen can be determined based on the input of the user on the scroll screen, the target zoom ratio can be obtained based on the unfolding parameter of the scroll screen, and then photographing is performed based on the target zoom ratio, to obtain a target file. The target file includes at least one of the following: an image or a video. In this way, during a photographing process, the user can perform a corresponding input on the scroll screen and perform photographing based on different unfolding parameters, to obtain images or videos with different effects. Without a need to perform adjustment by using a photographing parameter control, a photographing parameter can be more directly and flexibly adjusted in embodiments of this application. This not only improves photographing efficiency, but also increases photographing fun.

With reference to the accompanying drawings, a photographing method and apparatus, and an electronic device provided in embodiments of this application are described in detail by using embodiments and application scenarios.

It should be noted that, the photographing method provided in embodiments of this application may be applied to a photographing apparatus having a scroll screen. For example, the photographing apparatus can be understood as an electronic device, or functional control or a functional unit in the electronic device, that is, the photographing apparatus is used in the electronic device.

An embodiment of this application provides a photographing method. FIG. 1 is a flowchart of the photographing method according to embodiments of this application. As shown in FIG. 1, the photographing method provided in embodiments of this application may include the following step 201 to step 203.

Step 201: Receive a first input performed by a user to a scroll screen.

In embodiments of this application, the first input may be a touch input performed by the user to the scroll screen, or a voice command entered by the user, or a specific gesture entered by the user, and may be determined based on actual use requirements and is not limited in embodiments of this application.

For example, the touch input may be a tapping input performed by the user to the scroll screen. The specific gesture in embodiments of this application may be any one of a single-tapping gesture, a sliding gesture, a dragging gesture, a pressure recognition gesture, a long-press gesture, an area change gesture, a double-touch gesture, or a double-tapping gesture. The tapping input in embodiments of this application may be a single-tapping input, a double-tapping input, a tapping input for any quantity of times, or the like, or may also be a long-press input or a short-press input.

In embodiments of this application, the first input is an input for expanding and/or contracting the scroll screen.

In embodiments of this application, the photographing apparatus may receive the first input of the user while displaying a photographing preview interface.

It should be noted that this application is executed when an electronic device runs a camera application. In a scenario in which the electronic device runs the camera application in the foreground and in a photographing preview state, the technical solutions of this application may be executed.

In embodiments of this application, the photographing preview interface may be an image preview interface, or may be a video preview interface. This is not limited in embodiments of this application.

Step 202: In response to the first input, obtain a photographing parameter based on an unfolding parameter of the scroll screen.

In embodiments of this application, the unfolding parameter is determined based on the first input. That is, the photographing apparatus determines the unfolding parameter of the scroll screen based on behavior of the user to expand and/or contract the scroll screen, and determines a photographing parameter of the preview interface based on the unfolding parameter of the scroll screen.

Optionally, in embodiments of this application, the unfolding parameter of the scroll screen includes an unfolding ratio or an unfolding length. For example, the unfolding ratio of the scroll screen is a ratio of the unfolding length of the scroll screen to a total screen length of the scroll screen.

Optionally, in embodiments of this application, the scroll screen includes two states: an expanded state and a contracted state. When the scroll screen is in the expanded state, the scroll screen includes a first screen region and a second screen region. When the scroll screen is in the contracted state, the scroll screen includes the first screen region, but does not include the second screen region (the second screen region is contracted to the inside of the electronic device).

Optionally, in embodiments of this application, the photographing parameter includes at least one of the following: a zoom ratio, contrast, brightness, a hue, a resolution ratio, or the like.

Step 203: Perform photographing based on the photographing parameter, to obtain a target file, where the target file includes at least one of the following: an image or a video.

In embodiments of this application, after receiving the first input performed by the user to the scroll screen, the unfolding parameter of the scroll screen can be determined based on the input performed by the user to the scroll screen, a target zoom ratio can be obtained based on the unfolding parameter of the scroll screen, and then photographing is performed based on the target zoom ratio, to obtain the target file. The target file includes at least one of the following: the image or the video. In this way, during a photographing process, the user can perform a corresponding input on the scroll screen and perform photographing based on different unfolding parameters, to obtain images or videos with different effects. Without a need to perform adjustment by using a photographing parameter control, a photographing parameter can be more directly and flexibly adjusted in embodiments of this application. This not only improves photographing efficiency, but also increases photographing fun.

Optionally, in embodiments of this application, the following uses the photographing parameter as a zoom ratio as an example to describe the photographing method provided by embodiments of this application.

In some possible embodiments, a process of "obtain a photographing parameter based on an unfolding parameter of the scroll screen" in step 202 may include the following step **202*a*1**.

Step **202*a*1**: Determine the target zoom ratio based on the unfolding parameter of the scroll screen.

With reference to step **202*a*1, a process of "perform photographing based on the photographing parameter, to obtain a target file" in step 203 may include the following step 203*al***.

Step **203*a*1**: Perform photographing based on the target zoom ratio, to obtain the target file.

For example, after determining the target zoom ratio, the photographing apparatus may adjust a zoom ratio of a current photographing preview interface based on the target zoom ratio.

In this way, when the user wants to adjust the zoom ratio, the zoom ratio can be controlled by controlling the unfolding parameter of the scroll screen. This improves adjustment efficiency.

In some possible embodiments, before step 201, embodiments of this application may further include the following step **201*b*1**.

Step **201*b*1**: Obtain a target zoom range based on a current zoom ratio.

The target zoom ratio is a zoom ratio within the target zoom range.

For example, after determining the target zoom range, the photographing apparatus may determine the target zoom ratio from the target zoom range with reference to the foregoing step **202*a*1 and step 203*a*1** and based on the unfolding parameter of the scroll screen, and then perform photographing based on the target zoom ratio, to obtain the target file. In one example, when the user wants to adjust the zoom ratio, the first input executed may be a continuous input, so that the zoom ratio can be flexibly adjusted within the target zoom range.

For example, when the user wants to adjust the zoom ratio, the photographing apparatus may obtain the current zoom ratio, and then determine the target zoom range based on a current unfolding ratio of the scroll screen. For example, a ratio range interval corresponding to the target zoom range is [L, R], where L is a current zoom ratio –K, and R is a current zoom ratio +K. It should be noted that the K value may be a fixed value (for example, 1), or may be flexibly set based on an actual requirement. This is not limited in embodiments of this application.

It should be noted that a zoom threshold corresponding to an interval boundary of the ratio range interval corresponding to the target zoom range belongs to a preset zoom range. That is, if a zoom threshold corresponding to the upper boundary of a ratio range interval determined based on the current zoom ratio exceeds a maximum value of the predetermined zoom range, the maximum value of the predetermined zoom range region is selected as the zoom threshold corresponding to the upper boundary. Otherwise, if the zoom threshold corresponding to the lower boundary of the ratio range interval determined based on the current zoom ratio exceeds a minimum value of the predetermined zoom range, the minimum value of the predetermined zoom range is selected as the zoom threshold corresponding to the lower boundary.

For example, it is assumed that a zoom range (that is, the foregoing predetermined zoom range) corresponding to the zoom ratio when the photographing apparatus performs photographing is [0.6×, 10×]. If the current zoom ratio is 1× and K is equal to 1, because 0 is less than 0.6×, the minimum value of the target zoom range is 0.6×. In this case, an accurate zoom control range (that is, the foregoing target zoom range) of the scroll screen is [0.6×, 2×]. If the current zoom ratio is 8.5×, the accurate zoom control range of the scroll screen is [7.5×, 9.5×]. If the current zoom ratio is 9.2×, because 10.2× is greater than 10×, the maximum value of the target zoom range is 10×, and the accurate zoom control range of the scroll screen is [8.2×, 10×].

For example, the photographing apparatus may control the zoom ratio by controlling the unfolding ratio of the scroll screen. Generally, the scroll screen 0% corresponds to a left boundary (that is, the lower boundary) of the ratio range interval corresponding to the target zoom range, and the scroll screen 100% corresponds to a right boundary (that is, the upper boundary) of the ratio range interval corresponding to the target zoom range. For example, that the target zoom range is 0.6×-2× is used as an example. The unfolding ratio 0% is corresponding to 0.6×; and the unfolding ratio 100% is corresponding to 2×.

Figure 2:
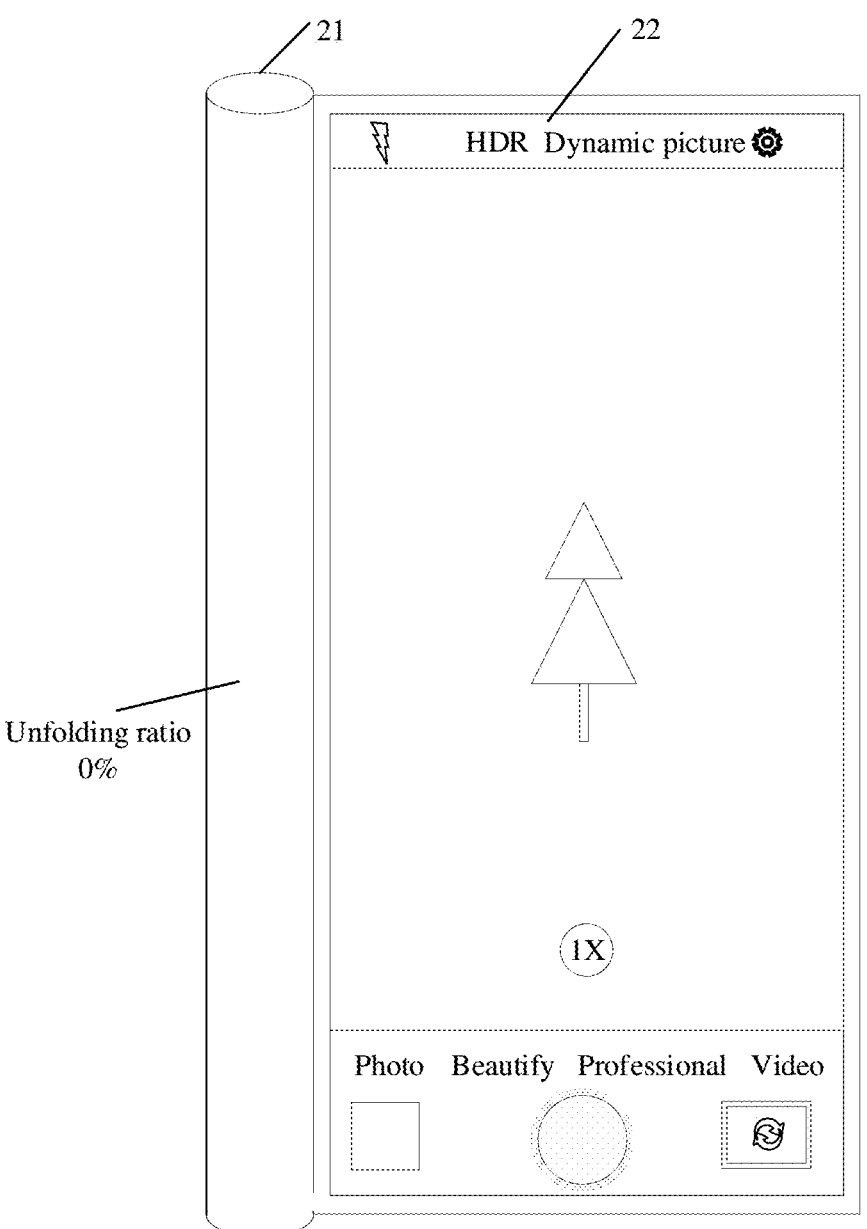
FIG. 2 is a first schematic diagram of an interface applied to a photographing method according to an embodiment of this application.
Figure 3:
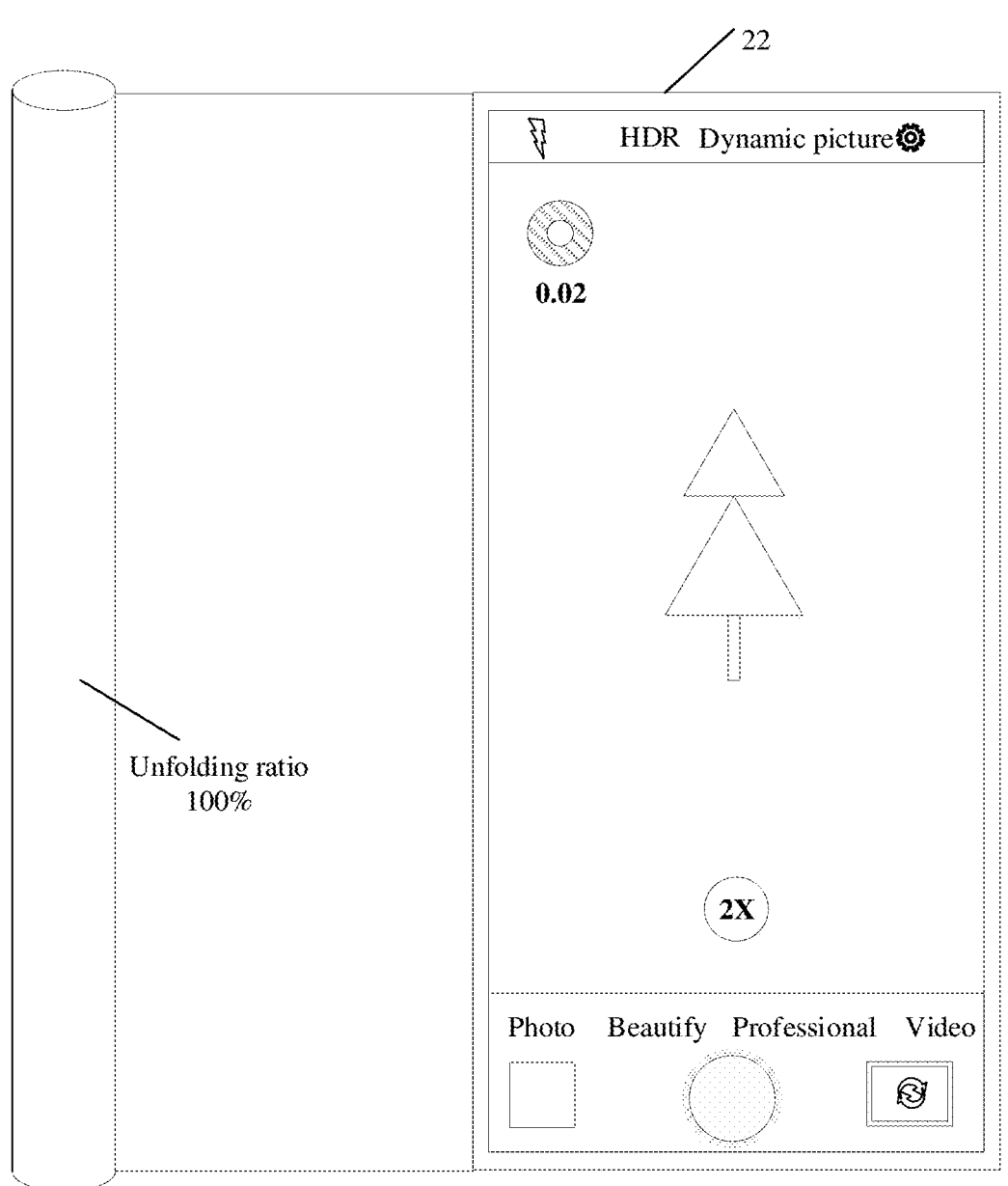
FIG. 3 is a second schematic diagram of an interface applied to a photographing method according to an embodiment of this application.

It should be noted that, generally, the unfolding ratio of a scroll is [0%, 100%]. As shown in FIG. 2, the unfolding ratio is 0% when the scroll screen is completely closed. For example, a first display region of the scroll screen is completely contracted to a scroll 21, and a photographing preview interface 22 is displayed in a second display region. As shown in FIG. 3, the unfolding ratio is 100% when the scroll screen is completely expanded. For example, the first display region of the scroll screen is completely expanded, and the photographing preview interface 22 is displayed in the second display region.

In this way, when the user wants to adjust the zoom ratio, the zoom range may be reduced based on the current zoom ratio, so that the zoom ratio can be more precisely adjusted. This improves adjustment efficiency.

In some possible embodiments, a process of "perform photographing based on the photographing parameter, to obtain a target file" in step 203 may include the following step A1.

Step A1: Perform photographing based on the photographing parameter and a zoom step, to obtain the target file.

For example, the zoom step may be a predetermined zoom step, or a zoom step manually selected by the user.

For example, with reference to the foregoing step A1, before the foregoing step 203, the photographing method provided in embodiments of this application may further include the following step A2 and step A3.

Step A2: Receive a fourth input performed by the user to the photographing preview interface.

Step A3: In response to the fourth input, determine the zoom step.

For example, the fourth input may be a touch input performed by the user to the scroll screen, or a voice command entered by the user, or a specific gesture entered by the user; and may be determined based on an actual use requirement. This is not limited in embodiments of this application.

In an example, the touch input may be a tapping input performed by the user to the scroll screen. The specific gesture in embodiments of this application may be any one of a single-tapping gesture, a sliding gesture, a dragging gesture, a pressure recognition gesture, a long-press gesture, an area change gesture, a double-touch gesture, or a double-tapping gesture. The tapping input in embodiments of this application may be a single-tapping input, a double-tapping input, a tapping input for any quantity of times, or the like, or may also be a long-press input or a short-press input.

In an example, N controls may be displayed on the photographing preview interface, and each control is corresponding to a zoom step. The user may use, by touching a target control (that is, one of the foregoing N controls), a zoom step corresponding to the target control as a zoom step to be used, for example, 0.1×, 0.05×, and 0.01×. A value of the zoom step is not limited in embodiments of this application.

For example, the photographing apparatus may further calculate the zoom ratio of the photographing preview interface based on the unfolding ratio of the scroll screen and a formula 1. The formula 1 is as follows: $H+\lfloor a \%*(R-L)/k \rfloor*k$, where H is the zoom ratio, the unfolding ratio of the scroll screen is a %, R is an upper boundary value of the target zoom range, L is a lower boundary value of the target zoom range, K is a target zoom step (that is, a set minimum zoom step), and $\lfloor\ \rfloor$ indicates rounding off or rounding up and down.

Figure 4:
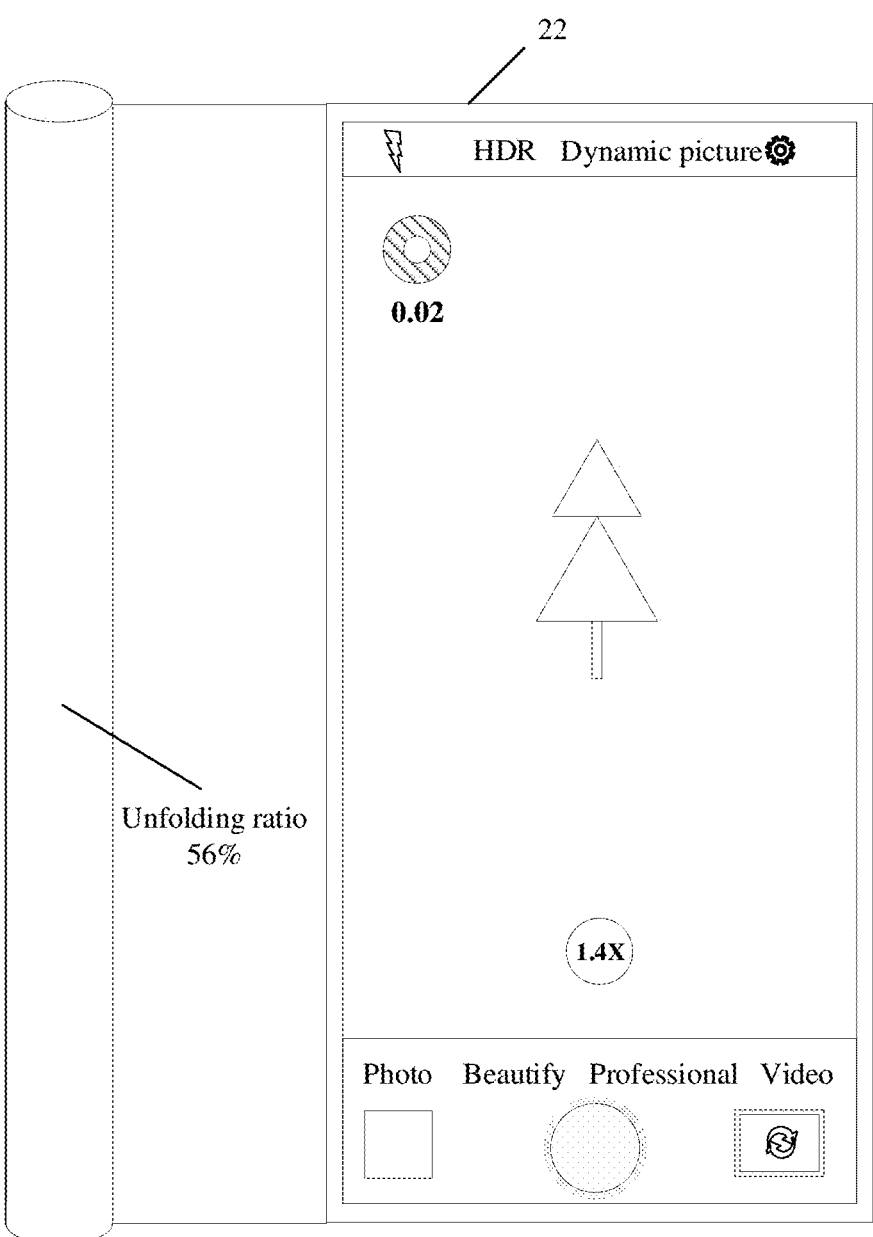
FIG. 4 is a third schematic diagram of an interface applied to a photographing method according to an embodiment of this application.

For example, as shown in FIG. 2 and FIG. 4, when the unfolding ratio of the scroll screen is 56%, and the zoom step is set to 0.02×, the target zoom ratio is $0.6+[56\%*(2-0.6)/0.02]*0.02=0.6+40*0.02=1.4$, that is, 1.4×.

For example, when the unfolding ratio is 78%, and a default zoom step is 0.1×, the target zoom ratio is $0.6+[78\%*(2-0.6)/0.1]*0.1=0.6+11*0.1=1.7×$, that is, 1.7×.

In this way, when the user wants to adjust the zoom ratio, the user may select a proper zoom step, so that the zoom ratio can be adjusted based on a proper adjustment speed. This improves user experience.

In some possible embodiments, before step 203, the photographing method provided in embodiments may further include the following step C1 and step C2.

Step C1: Receive a second input performed by the user to the scroll screen.

Step C2: In response to the second input, obtain the target zoom region.

With reference to step C1 and step C2, a process of "perform photographing based on the photographing parameter, to obtain a target file" in step 203 may include the following step C3.

Step C3: Perform photographing on a photographing object in the target zoom region based on the photographing parameter, to obtain the target file.

For example, step C1 may be performed before step 201, or may be performed after step 201. This is not limited in embodiments of this application.

For example, the second input is used to determine the target zoom region.

For example, the second input may be a touch input performed by the user to the scroll screen, or a voice command entered by the user, or a specific gesture entered by the user; and may be determined based on an actual use requirement. This is not limited in embodiments of this application.

For example, the touch input may be a tapping input performed by the user to the scroll screen. The specific gesture in embodiments of this application may be any one of a single-tapping gesture, a sliding gesture, a dragging gesture, a pressure recognition gesture, a long-press gesture, an area change gesture, a double-touch gesture, or a double-tapping gesture. The tapping input in embodiments of this application may be a single-tapping input, a double-tapping input, a tapping input for any quantity of times, or the like, or may also be a long-press input or a short-press input.

In an example, the scroll screen includes a screen region and a scroll region. For example, the scroll region of the scroll screen may be a scroll-type display, or may include a control component for controlling the scroll screen. The scroll region and a hardware form of the scroll are not limited in embodiments of this application.

The second input may be an input performed by the user to the scroll.

In an example, when step C2 is performed, the photographing apparatus may determine, in response to the second input, the target zoom region from the photographing preview interface based on a touch position of the second input.

For example, the target zoom region may be a part or all of the region of the photographing preview interface.

In some possible embodiments, before step 203, the photographing method provided in embodiments may further include the following step D1 and step D2.

Step D1: Receive a third input performed by the user to the scroll screen.

Step D2: In response to the third input, obtain a target zoom object.

With reference to step D1 and step D2, a process of "perform photographing based on the photographing parameter, to obtain a target file" in step 203 may include the following step D3.

Step D: Perform photographing on the target zoom object based on the photographing parameter, to obtain the target file.

For example, step D1 may be performed before step 201, or may be performed after step 201. This is not limited in embodiments of this application.

For example, the third input is used to determine the target zoom object.

For example, the third input may be a touch input performed by the user to the scroll screen, or a voice command entered by the user, or a specific gesture entered by the user; and may be determined based on an actual use requirement. This is not limited in embodiments of this application.

For example, the touch input may be a tapping input performed by the user to the scroll screen. The specific gesture in embodiments of this application may be any one of a single-tapping gesture, a sliding gesture, a dragging gesture, a pressure recognition gesture, a long-press gesture, an area change gesture, a double-touch gesture, or a double-tapping gesture. The tapping input in embodiments of this application may be a single-tapping input, a double-tapping input, a tapping input for any quantity of times, or the like, or may also be a long-press input or a short-press input.

In an example, the scroll screen includes a screen region and a scroll region. For example, the scroll region of the scroll screen may be a scroll-type display, or may include a control region. The scroll region and a hardware form of the scroll are not limited in embodiments of this application.

The third input may be an input performed by the user to the scroll.

In an example, when step D2 is performed, the photographing apparatus may determine, in response to the third input, the target zoom object from the photographing preview interface based on a touch position of the third input.

For example, the target zoom object may be all or a part of photographing objects in a preview image displayed on the photographing preview interface.

For example, the zoom object may be a character, an animal, a building, a plant, or the like.

For example, that the third input is an input performed by the user to the scroll is used as an example. If the scroll of the scroll screen includes N second regions, and each region is corresponding to one object on the photographing preview interface, the third input includes: a touch input performed by the user to a target region on the scroll of the scroll screen. Similarly, that the second input is an input performed by the user to the scroll is used as an example. If the scroll of the scroll screen includes M second regions, and each region is corresponding to one region of the photographing preview interface, the second input includes a touch input performed by the user to a target region on the scroll of the scroll screen, where M is a positive integer.

It should be noted that the target region is at least one of the N second regions. The target zoom object is a zoom object corresponding to the target region, and the target zoom region is the target region.

For example, the second input or the third input may be a touch input performed by the user to the scroll (for example, a tapping input, a sliding input, and a press input). The foregoing tapping operation may be any quantity of tapping operations, or may be a long-press operation (a tapping time is greater than or equal to a preset time), or may be a short-press operation (a tapping time is less than the preset time), or the like. The foregoing sliding operation may be a sliding operation in any direction, for example, upward sliding, downward sliding, left sliding, right sliding, clockwise sliding, or anti-clockwise sliding.

For example, the foregoing target region may be one or more regions, that is, the user may select one or more zoom objects or zoom regions in a photographing preview region by touching one or more regions on the scroll of the scroll screen.

For example, the N second regions obtained through division of the scroll of the scroll screen may be evenly divided (that is, a region area of each second region is the same), or may be unevenly divided (that is, some of region areas of the N second regions may be the same or different). This is not limited in embodiments of this application.

For example, the N second regions may form all areas on the scroll of the scroll screen, or may form a part region (for example, an upper part of the scroll) in the scroll of the scroll screen. This is not limited in embodiments of this application.

Figure 5:
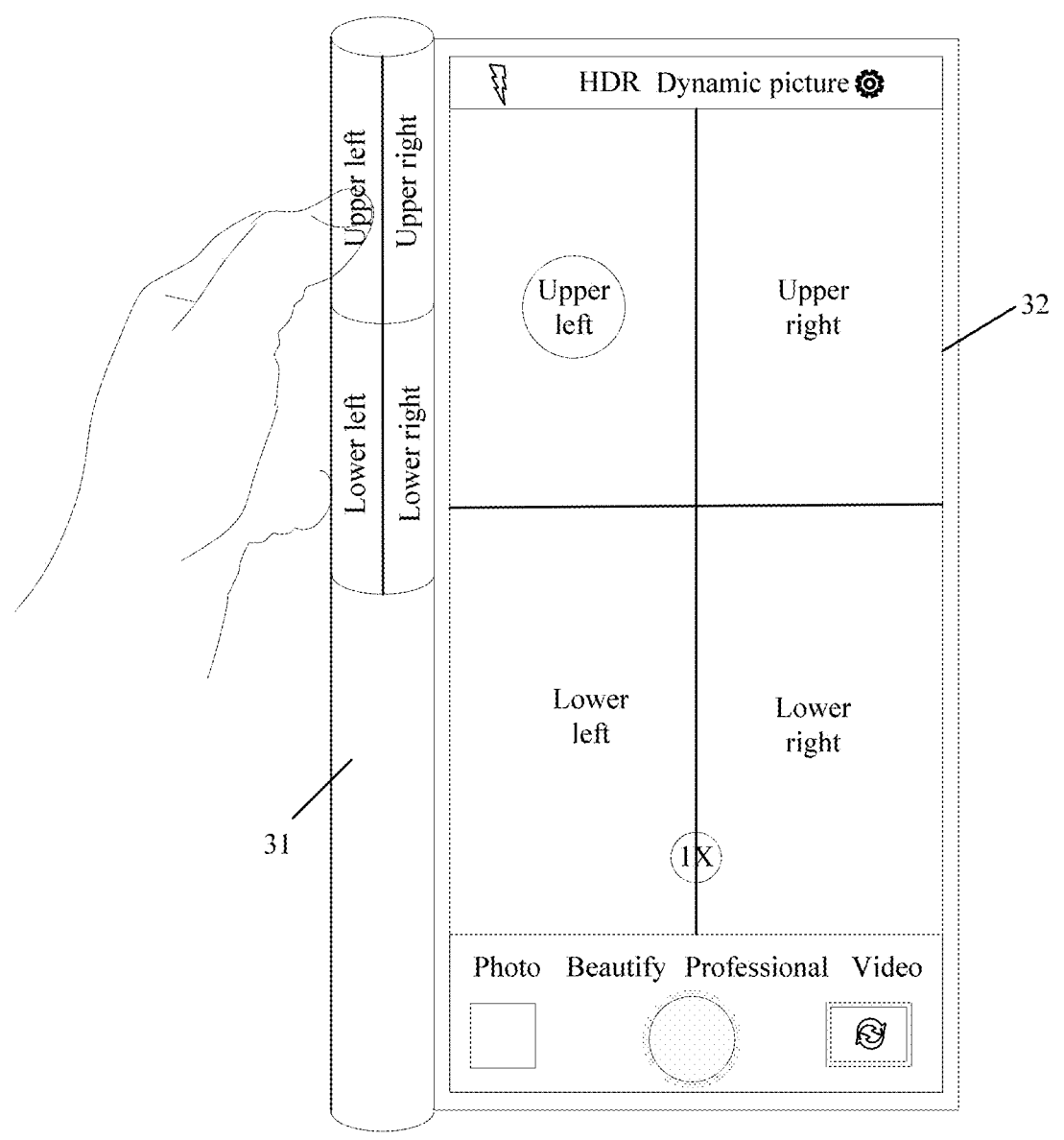
FIG. 5 is a fourth schematic diagram of an interface applied to a photographing method according to an embodiment of this application.

For example, as shown in FIG. 5 and FIG. 6, it is assumed that the upper half of a scroll 31 of the scroll screen is divided into four regions, which are respectively: the upper left region, the upper right region, the lower left region, and the lower right region. The four regions respectively control the upper left region, the upper right region, the lower left region, and the lower right region of the photographing preview interface 32. For example, as shown in FIG. 5, if the user touches the upper left region of the scroll screen, a picture at the upper left position of the photographing preview interface 32 is enlarged. As shown in FIG. 6, if the user taps the lower right region of the scroll screen, a picture at the lower right position of the photographing preview interface 32 is enlarged.

It should be noted that when the user does not touch the scroll of the scroll screen, a center region of the photographing preview interface may be adjusted.

In this way, the scroll of the scroll screen is divided into a plurality of regions, so that the user can quickly select, based on a mapping relationship between the plurality of regions in the scroll screen and a plurality of objects on the photographing preview interface, a target object to perform adjustment. This improves adjustment efficiency.

It should be noted that the photographing method provided in embodiments of this application may be performed by a photographing apparatus or a control module, in the photographing apparatus, configured to perform the photographing method. In embodiments of this application, the photographing apparatus provided in embodiments of this application is described by taking that the photographing apparatus performs the photographing method as an example.

An embodiment of this application provides a photographing apparatus. The photographing apparatus includes a scroll screen. As shown in FIG. 7, the photographing apparatus 400 further includes: a receiving module 401 and an execution module 402.

The receiving module 401 is configured to receive a first input performed by a user to the scroll screen. The execution module 402 is configured to: in response to the first input received by the receiving module 401, obtain a photographing parameter based on an unfolding parameter of the scroll screen, where the unfolding parameter is determined based on the first input; and perform photographing based on the photographing parameter, to obtain a target file, where the target file includes at least one of the following: an image or a video.

In some possible embodiments, the unfolding parameters include an unfolding ratio or an unfolding length.

In the photographing apparatus provided by embodiments of this application, after receiving the first input performed by the user to the scroll screen, the unfolding parameter of the scroll screen can be determined based on the input performed by the user to the scroll screen, the photographing parameter can be obtained based on the unfolding parameter of the scroll screen, and then photographing is performed based on the photographing parameter, to obtain the target file. The target file includes at least one of the following: the image or the video. In this way, during a photographing process, the user can perform a corresponding input on the scroll screen and perform photographing based on different unfolding parameters, to obtain images or videos with different effects. Without a need to perform adjustment by using a photographing parameter control, a photographing parameter can be more directly and flexibly adjusted in embodiments of this application. This not only improves photographing efficiency, but also increases photographing fun.

In some possible embodiments, the execution module 402 is configured to:

determine a target zoom ratio based on the unfolding parameter of the scroll screen; and perform photographing based on the target zoom ratio, to obtain the target file.

In this way, when the user wants to adjust the zoom ratio, the zoom ratio can be controlled by controlling the unfolding parameter of the scroll screen. This improves adjustment efficiency.

In some possible embodiments, the execution module 402 is further configured to:

obtain a target zoom range based on a current zoom ratio, where the target zoom ratio is a zoom ratio within the target zoom range.

In this way, when the user wants to adjust the zoom ratio, the zoom range may be reduced based on the current zoom ratio, so that the zoom ratio can be more precisely adjusted. This improves adjustment efficiency.

In some possible embodiments, the receiving module 401 is further configured to receive a second input performed by the user to the scroll screen. The execution module 402 is further configured to: in response to the second input received by the receiving module 401, obtain a target zoom region. The execution module 402 is configured: perform photographing on a photographing object in the target zoom region based on the photographing parameter, to obtain the target file.

In this way, a zoom object is quickly selected with reference to a mapping relationship between a plurality of regions in the scroll screen and a plurality of zoom regions on a photographing preview interface. This improves adjustment efficiency.

In some possible embodiments, the receiving module 401 is further configured to receive a third input performed by the user to the scroll screen. The execution module 402 is further configured to: in response to the third input received by the receiving module 401, obtain a target zoom object. The execution module 402 is configured to: perform photographing on the target zoom object based on the photographing parameter, to obtain the target file.

In this way, the zoom object is quickly selected for adjustment with reference to the mapping relationship between the plurality of regions in the scroll screen and a plurality of zoom objects on the photographing preview interface. This improves adjustment efficiency.

In some possible embodiments, the receiving module 401 is further configured to receive a fourth input performed by the user to the photographing preview interface. The execution module 402 is further configured to: in response to the fourth input received by the receiving module 401, determine a zoom step. The execution module 402 is configured to perform photographing based on the photographing parameter and the zoom step, to obtain the target file.

In this way, when the user wants to adjust the zoom ratio, the user may select a proper zoom step, so that the zoom ratio can be adjusted based on a proper adjustment speed. This improves user experience.

The photographing apparatus in embodiments of this application may be an apparatus, or a component, an integrated circuit, or a chip in a terminal. The apparatus may be a mobile electronic device, or may be a non-mobile electronic device. For example, the mobile electronic device may be a mobile phone, a tablet computer, a notebook computer, a palmtop computer, an in-vehicle electronic device, a wearable device, an ultra-mobile personal computer (UMPC), a netbook, or a personal digital assistant (PDA). The non-mobile electronic device may be a server, a network attached storage (NAS), a personal computer (PC), a television (TV), an automated teller machine or a self-service machine. This is not limited in embodiments of this application.

The photographing apparatus in embodiments of this application may be an apparatus having an operating system. The operating system may be an Android operating system, an iOS operating system, or another possible operating system. This is not limited in embodiments of this application.

The photographing apparatus provided in embodiments of this application can implement the processes that are implemented in the foregoing method embodiments. To avoid repetition, details are not described herein again.

Figure 8:
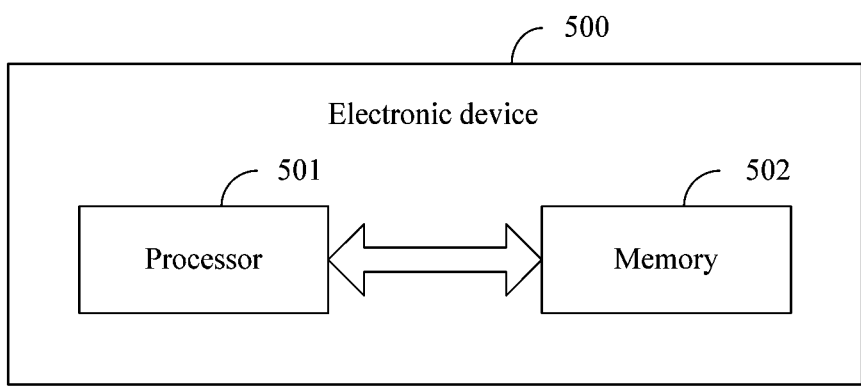
FIG. 8 is a schematic diagram of a structure of an electronic device according to an embodiment of this application.

Optionally, as shown in FIG. 8, an embodiment of this application further provides an electronic device 500, including a processor 501, a memory 502, and a program or instructions stored in the memory 502 and executable on the processor 501. When the program or the instructions are executed by the processor 501, the processes of the foregoing photographing method embodiments are implemented, with the same technical effects achieved. To avoid repetition, details are not described herein again.

It should be noted that the electronic device in embodiments of this application includes the foregoing mobile electronic device and the foregoing non-mobile electronic device.

Figure 9:
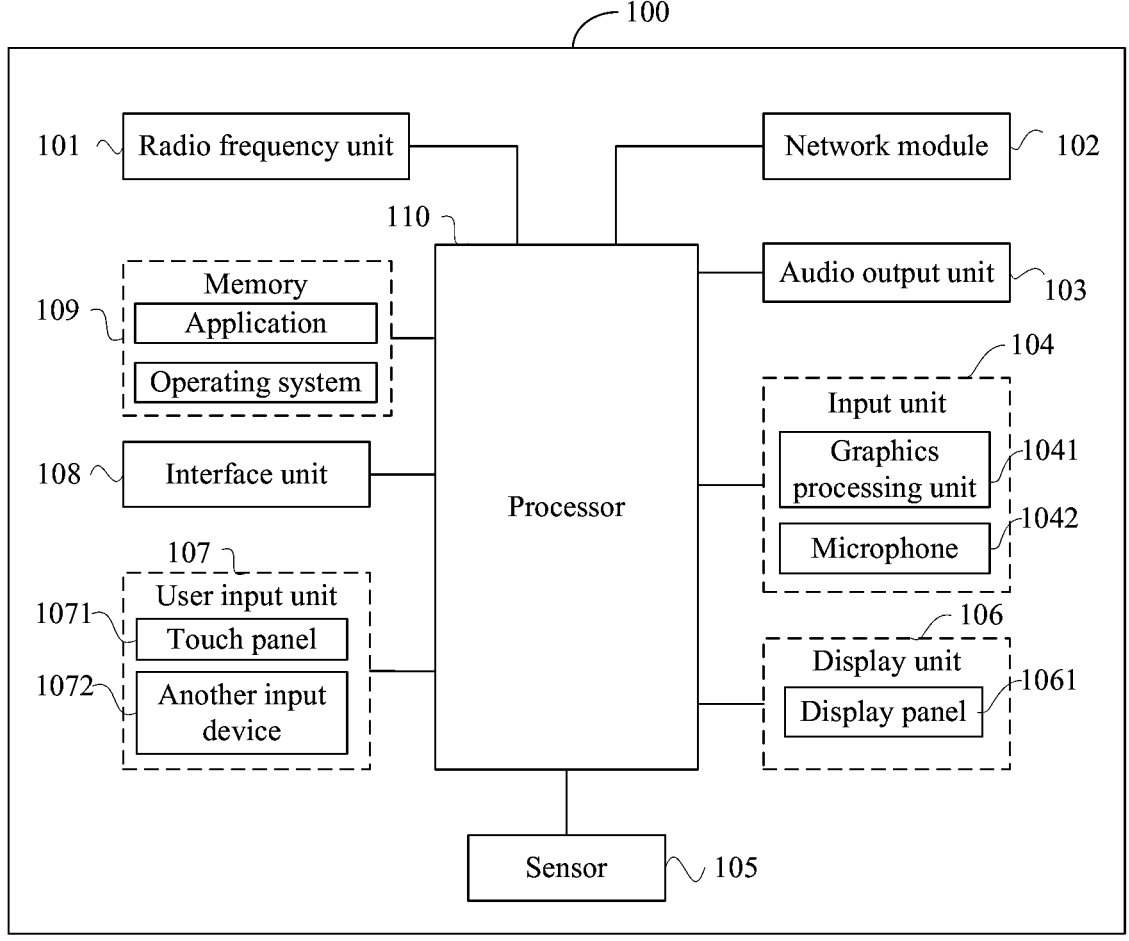
FIG. 9 is a schematic diagram of a hardware structure of an electronic device according to an embodiment of this application.

FIG. 9 is a schematic diagram of a hardware structure of an electronic device to implement an embodiment of this application.

The electronic device 100 includes but is not limited to components such as a radio frequency unit 101, a network module 102, an audio output unit 103, an input unit 104, a sensor 105, a display unit 106, a user input unit 107, an interface unit 108, a memory 109, and a processor 110.

A person skilled in the art can understand that the electronic device 100 may further include a power supply (such as a battery) that supplies power to each component. The power supply may be logically connected to the processor 110 by using a power supply management system, to implement functions such as charging and discharging management, and power consumption management by using the power supply management system. The structure of the electronic device shown in FIG. 9 does not constitute a limitation on the electronic device. The electronic device may include components more or fewer than those shown in the diagram, a combination of some components, or different component arrangements. Details are not described herein.

The user input unit 107 is configured to receive a first input performed by a user to a scroll screen. The processor 110 is configured to: in response to the first input received by the user input unit 107, obtain a photographing parameter based on an unfolding parameter of the scroll screen, where the unfolding parameter is determined based on the first input; and perform photographing based on the photographing parameter, to obtain a target file, where the target file includes at least one of the following: an image or a video.

In some possible embodiments, the unfolding parameters include an unfolding ratio or an unfolding length.

In embodiments of this application, after receiving the first input performed by the user to the scroll screen, the unfolding parameter of the scroll can be determined based on the input performed by the user to the scroll screen, the photographing parameter can be obtained based on the unfolding parameter of the scroll screen, and then photographing is performed based on the photographing parameter, to obtain the target file. The target file includes at least one of the following: the image or the video. In this way, during a photographing process, the user can perform a corresponding input on the scroll screen and perform photographing based on different unfolding parameters, to obtain images or videos with different effects. Without a need to perform adjustment by using a photographing parameter control, a photographing parameter can be more directly and flexibly adjusted in embodiments of this application. This not only improves photographing efficiency, but also increases photographing fun.

In some possible embodiments, the processor 110 is configured to:

determine a target zoom ratio based on the unfolding parameter of the scroll screen; and perform photographing based on the target zoom ratio, to obtain the target file.

In this way, when the user wants to adjust the zoom ratio, the zoom ratio can be controlled by controlling the unfolding parameter of the scroll screen. This improves adjustment efficiency.

In some possible embodiments, the processor 110 is further configured to:

obtain a target zoom range based on a current zoom ratio, where the target zoom ratio is a zoom ratio within the target zoom range.

In this way, when the user wants to adjust the zoom ratio, the zoom range may be reduced based on the current zoom ratio, so that the zoom ratio can be more precisely adjusted. This improves adjustment efficiency.

In some possible embodiments, the user input unit 107 is further configured to receive a second input performed by the user to the scroll screen. The processor 110 is further configured to: in response to the second input received by the user input unit 107, obtain a target zoom region. The processor 110 is configured to perform photographing on a photographing object in the target zoom region based on the photographing parameter, to obtain the target file.

In this way, a zoom object is quickly selected with reference to a mapping relationship between a plurality of regions in the scroll screen and a plurality of zoom regions on a photographing preview interface. This improves adjustment efficiency.

In some possible embodiments, the user input unit 107 is further configured to receive a third input performed by the user to the scroll screen. The processor 110 is further configured to: in response to the third input received by the user input unit 107, obtain a target zoom object. The processor 110 is configured to perform photographing on the target zoom object based on the photographing parameter, to obtain the target file.

In this way, the zoom object is quickly selected for adjustment with reference to the mapping relationship between the plurality of regions in the scroll screen and a plurality of zoom objects on the photographing preview interface. This improves adjustment efficiency.

In some possible embodiments, the user input unit 107 is further configured to receive a fourth input performed by the user to the photographing preview interface. The processor 110 is further configured to: in response to the fourth input received by the user input unit 107, determine a zoom step. The processor 110 is configured to perform photographing based on the photographing parameter and the zoom step, to obtain the target file.

In this way, when the user wants to adjust the zoom ratio, the user may select a proper zoom step, so that the zoom ratio can be adjusted based on a proper adjustment speed. This improves user experience.

It should be understood that, in embodiments of this application, the input unit 104 may include a graphics processing unit (GPU) 1041 and a microphone 1042. The graphics processing unit 1041 processes image data of a static picture or a video obtained by an image capture apparatus (such as a camera) in a video capture mode or an image capture mode. The display unit 106 may include a display panel 1061, and the display panel 1061 may be configured in a form of a liquid crystal display, an organic light-emitting diode, or the like.

The user input unit 107 includes a touch panel 1071 and another input device 1072. The touch panel 1071 is also referred to as a touchscreen. The touch panel 1071 may include two parts: a touch detection apparatus and a touch controller. The another input device 1072 may include but is not limited to a physical keyboard, a functional button (such as a volume control button or a power on/off button), a trackball, a mouse, and a joystick. Details are not described herein. The memory 109 may be configured to store a software program and various data, including but not limited to an application and an operating system. An application processor and a modem processor may be integrated into the processor 110, the application processor mainly processes an operating system, a user interface, an application, and the like, and the modem processor mainly processes wireless communication. It may be understood that, alternatively, the modem processor may not be integrated into the processor 110.

An embodiment of this application further provides a non-transitory readable storage medium. The non-transitory readable storage medium stores a program or instructions. When the program or the instructions are executed by a processor, processes of the photographing method embodiment are implemented, and a same technical effect can be achieved. To avoid repetition, details are not described herein again.

The processor is a processor in the electronic device in the foregoing embodiment. The non-transitory readable storage medium includes a non-transitory computer-readable storage medium, such as a computer read-only memory (ROM), a random access memory (RAM), a magnetic disk, or an optical disc.

An embodiment of this application further provides a chip. The chip includes a processor and a communication interface, the communication interface is coupled to the processor, and the processor is configured to run a program or instructions to implement the processes of the foregoing photographing method embodiment, and a same technical effect can be achieved. To avoid repetition, details are not described herein again.

It should be understood that the chip mentioned in embodiments of this application may also be referred to as a system-level chip, a system chip, a chip system, a system-on chip, or the like.

It should be noted that, in this specification, the term "include", "contain", or any other variant thereof is intended to cover a non-exclusive inclusion, so that a process, a method, an article, or an apparatus that includes a list of elements not only includes those elements but also includes other elements which are not expressly listed, or further includes elements inherent to this process, method, article, or apparatus. An element limited by "includes a . . ." does not, without more constraints, preclude the presence of additional identical elements in the process, method, article, or apparatus that includes the element.

In addition, it should be noted that the scope of the method and the apparatus in the implementations of this application is not limited to performing functions in an illustrated or discussed sequence, and may further include performing functions in a basically simultaneous manner or in a reverse sequence according to the functions concerned. For example, the described method may be performed in an order different from that described, and the steps may be added, omitted, or combined. In addition, features described with reference to some examples may be combined in other examples.

Based on the descriptions of the foregoing implementations, a person skilled in the art may clearly understand that the method in the foregoing embodiment may be implemented by software in addition to a necessary universal hardware platform or by hardware only. Based on such an understanding, the technical solutions of this application essentially or the part contributing to the prior art may be implemented in a form of a computer software product. The computer software product is stored in a storage medium (such as a ROM/RAM, a hard disk, or an optical disc), and includes several instructions for instructing a terminal (which may be mobile phone, a computer, a server, a network device, or the like) to perform the methods described in embodiments of this application.

Embodiments of this application are described above with reference to the accompanying drawings, but this application is not limited to the foregoing implementations, and the foregoing implementations are only illustrative and not restrictive. Under the enlightenment of this application, a person of ordinary skill in the art can make many forms without departing from the purpose of this application and the protection scope of the claims, all of which fall within the protection of this application.

What is claimed is:

1. A photographing method, applied to a photographing apparatus having a scroll screen, wherein the method comprises:

obtaining a target zoom range based on a current zoom ratio;

receiving a first input performed by a user to the scroll screen;

in response to the first input, obtaining a photographing parameter based on an unfolding parameter of the scroll screen, wherein the unfolding parameter is determined based on the first input; and performing photographing based on the photographing parameter, to obtain a target file, wherein the target file comprises at least one of following: an image or a video;

wherein the obtaining the photographing parameter based on the unfolding parameter of the scroll screen comprises:

determining a target zoom ratio based on the unfolding parameter of the scroll screen, wherein the target zoom ratio is a zoom ratio within the target zoom range; and the performing photographing based on the photographing parameter, to obtain the target file comprises:

performing photographing based on the target zoom ratio, to obtain the target file.

2. The method according to claim 1, wherein the unfolding parameter comprises an unfolding ratio or an unfolding length.

3. The method according to claim 1, wherein before the performing photographing based on the photographing parameter, to obtain the target file, the method further comprises:

receiving a second input performed by a user to the scroll screen; and in response to the second input, obtaining a target zoom region; and the performing photographing based on the photographing parameter, to obtain the target file comprises:

performing photographing on a photographing object in the target zoom region based on the photographing parameter, to obtain the target file.

4. The method according to claim 1, wherein before the performing photographing based on the photographing parameter, to obtain the target file, the method further comprises:

receiving a third input performed by a user to the scroll screen; and in response to the third input, obtaining a target zoom object; and the performing photographing based on the photographing parameter, to obtain the target file comprises:

performing photographing on the target zoom object based on the photographing parameter, to obtain the target file.

5. The method according to claim 1, wherein before the receiving the first input performed by the user to the scroll screen, the method further comprises:

receiving a fourth input performed by a user to a photographing preview interface; and in response to the fourth input, determining a zoom step; and the performing photographing based on the photographing parameter, to obtain the target file comprises:

performing photographing based on the photographing parameter and the zoom step, to obtain the target file.

6. An electronic device, comprising: a processor, a memory, and a program or instructions stored in the memory and executable on the processor, wherein the program or the instructions, when executed by the processor, cause the electronic device to perform:

obtaining a target zoom range based on a current zoom ratio;

receiving a first input performed by a user to a scroll screen of the electronic device;

in response to the first input, obtaining a photographing parameter based on an unfolding parameter of the scroll screen, wherein the unfolding parameter is determined based on the first input; and performing photographing based on the photographing parameter, to obtain a target file, wherein the target file comprises at least one of following: an image or a video;

wherein the program or the instructions, when executed by the processor, cause the electronic device to perform:

determining a target zoom ratio based on the unfolding parameter of the scroll screen, wherein the target zoom ratio is a zoom ratio within the target zoom range; and the program or the instructions, when executed by the processor, cause the electronic device to perform:

performing photographing based on the target zoom ratio, to obtain the target file.

7. The electronic device according to claim 6, wherein the unfolding parameter comprises an unfolding ratio or an unfolding length.

8. The electronic device according to claim 6, wherein program or the instructions, when executed by the processor, cause the electronic device to further perform:

receiving a second input performed by a user to the scroll screen; and in response to the second input, obtaining a target zoom region; and the program or the instructions, when executed by the processor, cause the electronic device to perform:

performing photographing on a photographing object in the target zoom region based on the photographing parameter, to obtain the target file.

9. The electronic device according to claim 6, wherein the program or the instructions, when executed by the processor, cause the electronic device to further perform:

receiving a third input performed by a user to the scroll screen; and in response to the third input, obtaining a target zoom object; and the program or the instructions, when executed by the processor, cause the electronic device to perform:

performing photographing on the target zoom object based on the photographing parameter, to obtain the target file.

10. The electronic device according to claim 6, wherein the program or the instructions, when executed by the processor, cause the electronic device to further perform:

receiving a fourth input performed by a user to a photographing preview interface; and in response to the fourth input, determining a zoom step; and the program or the instructions, when executed by the processor, cause the electronic device to perform:

performing photographing based on the photographing parameter and the zoom step, to obtain the target file.

11. A non-transitory readable storage medium, wherein the non-transitory readable storage medium stores a program or instructions, and the program or the instructions, when executed by a processor of an electronic device, cause the electronic device to perform:

obtaining a target zoom range based on a current zoom ratio;

receiving a first input performed by a user to a scroll screen of the electronic device;

in response to the first input, obtaining a photographing parameter based on an unfolding parameter of the scroll screen, wherein the unfolding parameter is determined based on the first input; and performing photographing based on the photographing parameter, to obtain a target file, wherein the target file comprises at least one of following: an image or a video;

wherein the program or the instructions, when executed by the processor, cause the electronic device to perform:

determining a target zoom ratio based on the unfolding parameter of the scroll screen, wherein the target zoom ratio is a zoom ratio within the target zoom range; and the program or the instructions, when executed by the processor, cause the electronic device to perform:

performing photographing based on the target zoom ratio, to obtain the target file.

12. The non-transitory readable storage medium according to claim 11, wherein the program or the instructions, when executed by the processor, cause the electronic device to further perform:

receiving a second input performed by a user to the scroll screen; and in response to the second input, obtaining a target zoom region; and the program or the instructions, when executed by the processor, cause the electronic device to perform:

performing photographing on a photographing object in the target zoom region based on the photographing parameter, to obtain the target file.

13. The non-transitory readable storage medium according to claim 11, wherein the program or the instructions, when executed by the processor, cause the electronic device to further perform:

receiving a third input performed by a user to the scroll screen; and in response to the third input, obtaining a target zoom object; and the program or the instructions, when executed by the processor, cause the electronic device to perform:

performing photographing on the target zoom object based on the photographing parameter, to obtain the target file.

14. The non-transitory readable storage medium according to claim 11, wherein the program or the instructions, when executed by the processor, cause the electronic device to further perform:

receiving a fourth input performed by a user to a photographing preview interface; and in response to the fourth input, determining a zoom step; and the program or the instructions, when executed by the processor, cause the electronic device to perform:

performing photographing based on the photographing parameter and the zoom step, to obtain the target file.

15. The non-transitory readable storage medium according to claim 11, wherein the unfolding parameter comprises an unfolding ratio or an unfolding length.

* * * * *